United States Patent [19]

Mishev et al.

[11] 4,089,627

[45] May 16, 1978

[54] APPARATUS FOR THE PRODUCTION OF PIPE-TYPE ARMORED SEPARATORS FOR STORAGE BATTERIES

[75] Inventors: Georgi Nikolov Mishev; Iliya Stoilkov Haralampiev, both of Sofia, Bulgaria

[73] Assignee: DSO "Balkankar", Sofia, Bulgaria

[21] Appl. No.: 615,725

[22] Filed: Sep. 22, 1975

Related U.S. Application Data

[63] Continuation-in-part of Ser. No. 525,973, Nov. 21, 1974, abandoned.

[30] Foreign Application Priority Data

Nov. 21, 1973 Bulgaria .................................. 25038

[51] Int. Cl.² .............................................. B29G 5/00
[52] U.S. Cl. .................................... 425/303; 425/307; 425/392; 425/446
[58] Field of Search ................ 425/302, 303, 392, 393, 425/468, 446

[56] References Cited

U.S. PATENT DOCUMENTS

| | | | |
|---|---|---|---|
| 3,158,897 | 12/1964 | Ball | 425/392 |
| 3,240,851 | 3/1966 | Scalora | 425/302 |
| 3,284,849 | 11/1966 | Coleman et al. | 425/302 |

*Primary Examiner*—Robert L. Spicer, Jr.
*Assistant Examiner*—John McQuade
*Attorney, Agent, or Firm*—Armstrong, Nikaido, Marmelstein & Kubovcik

[57] ABSTRACT

A device for the production of corrugated, protective separators for batteries which are made of woven polyester material. The device is provided with two alternating sets of shaping rods and two sets of clamping jaws which are movable in both the vertical and lateral direction. A third set of jaws is movable only in the vertical direction. The shaping rods are inserted into alternating channels in the material while the material is securely held by the clamping jaws and the material is hardened by means of a furnace. Once the channels are heat set, the shaping rods are withdrawn and the separator is severed by means of a cutting unit. A new piece of material is then positioned for similar fabrication.

3 Claims, 15 Drawing Figures

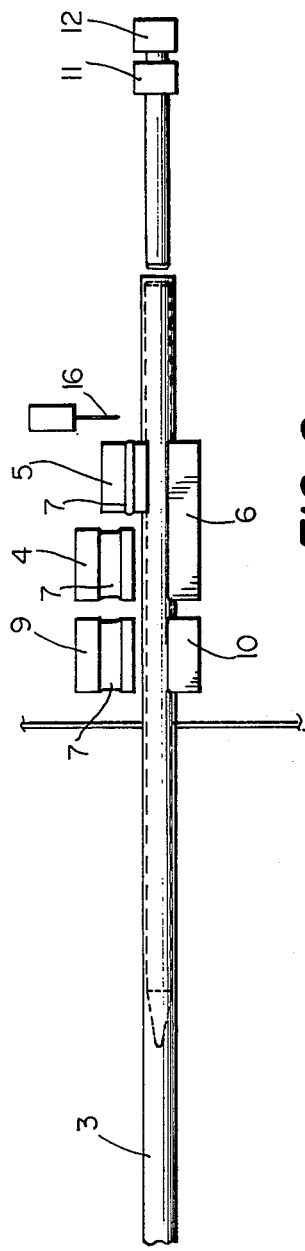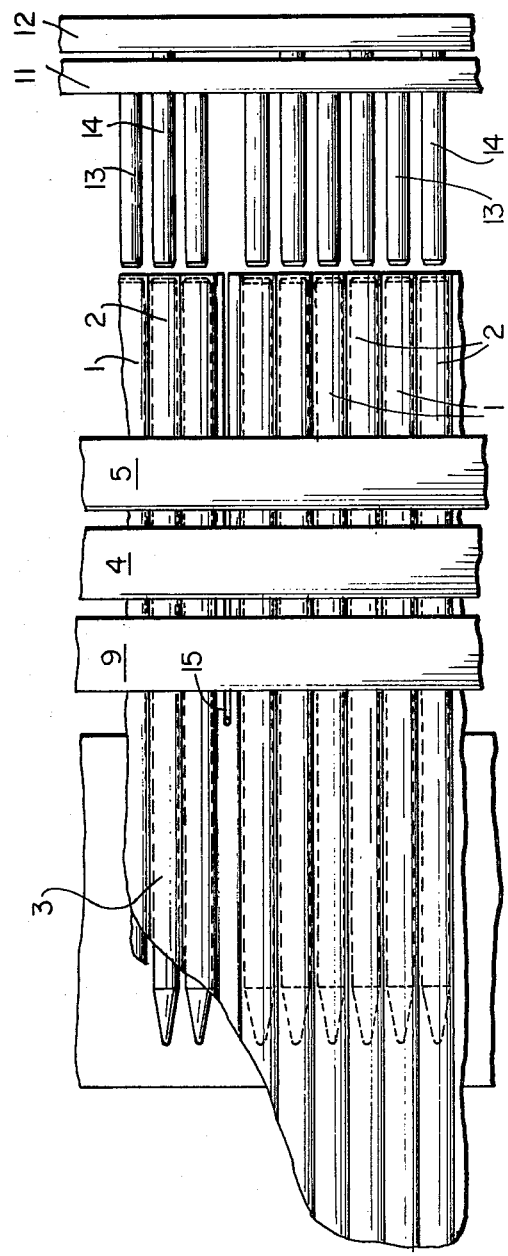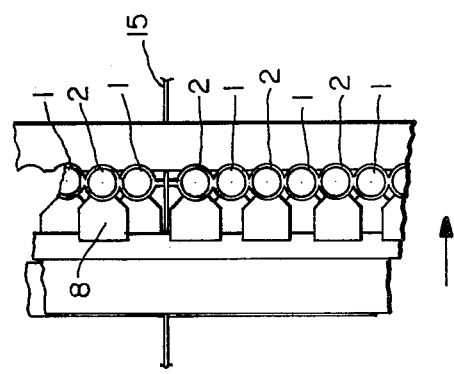

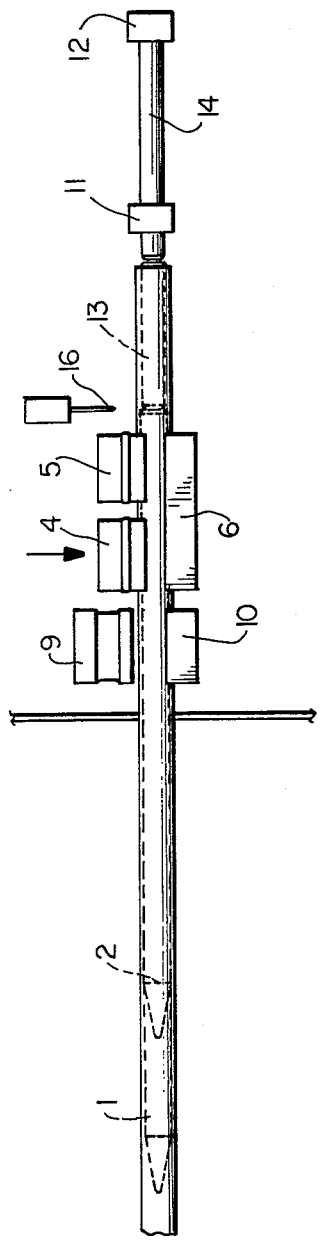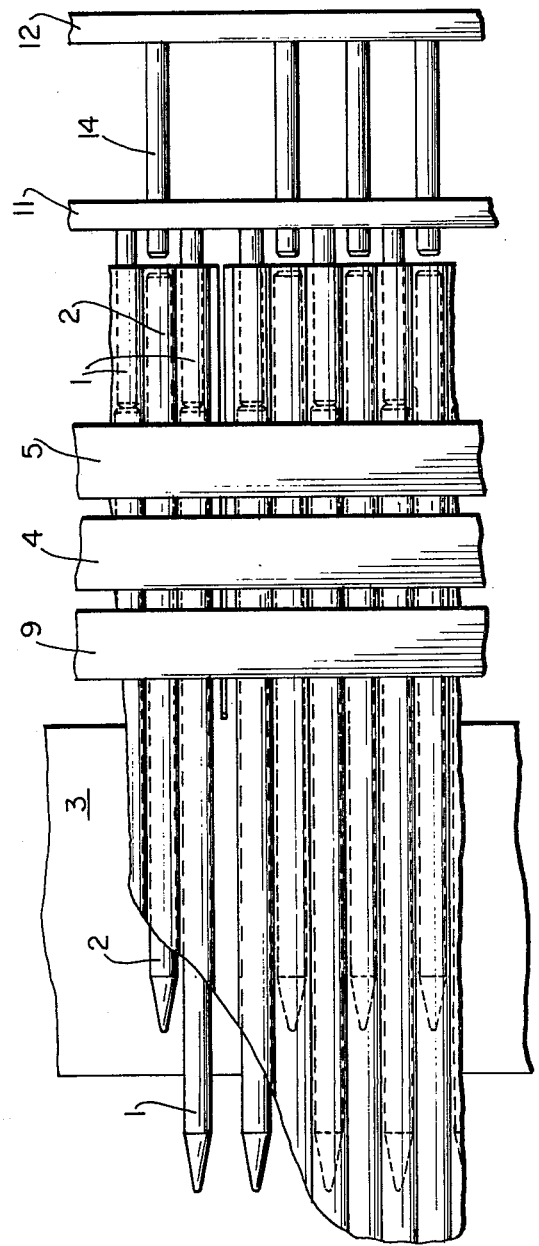
FIG. 9a
FIG. 9b

APPARATUS FOR THE PRODUCTION OF PIPE-TYPE ARMORED SEPARATORS FOR STORAGE BATTERIES

This application is a continuation-in-part of Ser. No. 525,973, filed Nov. 21, 1974, now abandoned.

This invention relates to an apparatus for the production of pipe-type armoured corrugated protective separators for storage batteries.

Different methods and apparatuses for the production of corrugated pipe-type protective separators are known, in which there are used as shaping elements during the heat processing of polyester fabric having the texture of linen and called Terylene cloth so-called "shaping rods" — usually of aluminum with a circular cross-section. A method is known in which these shaping rods are driven either manually in transversally woven cloth (the channels or pipes are transverse to the length of the cloth) or automatically by means of a suitable device. A further method is known in which the rods are driven in automatically in lengthwise woven cloth (the channels or pipes are lengthwise to the length of the cloth), and then the piece of cloth with shaping rods is cut and transferred to a heat processing (shaping) device. In all known methods the cloth is previously impregnated with appropriate chemicals to strengthen the cloth after heat treatment. In the case of transversally woven cloth, i.e., where channels are provided transverse to the length of the cloth, the cloth is cut at both sides to form an inlet and outlet for the pipes.

After baking the cloth containing the inserted shaping rods, during which the cloth is melted and thereby hardened and transformed into corrugated separators, the shaping rods are driven-out manually, mechanically or automatically. The separators thus obtained are cut manually with mechanized devices and machines, and then seared on the four edges manually, to fuse the material and avoid unravelling. The shaping rods are returned again for insertion into more cloth, either manually or automatically and in this way are reusable.

A drawback of the known methods and apparatuses for the production of corrugated separators is the use of manual labor for inserting and withdrawing the fixing rods. In several of these methods this drawback is avoided by performing these procedures automatically. However, all of the known methods use reusable rods, which are expensive and are worn out in a short time, the cutting of the separators is performed manually, and they require the additional production step of severing the separators by melting through the material.

It is therefore a general object of the present invention to provide an apparatus which solves the problems of producing corrugated separators-i.e., the automatic shaping of the corrugations in the cloth, avoiding the necessity to use the technologically undesirable transversely woven cloth, avoiding the additional production step of severing by melting by combining it by time with the other steps, and avoiding the use of reusable shaping rods.

The object of the invention is achieved by providing an apparatus, which features as shaping rods, constantly reciprocating, chromed and polished hard steel rods, the number of which is equal to the number of corrugations or channels in the woven cloth in which the channels are arranged lengthwise. The apparatus comprises two lengthwise movable clamping jaws, which by means of movable elements with shaped tips can hold the cloth on the inserted shaping rods. Thus, one jaw holds the cloth and inserted rods at alternate positions (the first, the third, the fifth, etc.), and the other jaw holds the other set of inserted shaping rods (the second, the fourth, the sixth, etc.). Alternatively, both jaws can simultaneously hold or move the cloth one step ahead a distance equal in length to the desired length of separators. Moreover, this apparatus comprises a lengthwise stationary jaw for holding the cloth in an unmovable position during the return of the movable jaws to their initial position. The apparatus comprises also two pushing combs upon which pushing rods are mounted which lie in the plane of the shaping rods which are inserted into the cloth corrugations. In other words, the one comb has its teeth opposite, for example, to alternating corrugations, while the other comb has its teeth opposite the other set of corrugations. Therefore, it is possible to push separately either of the alternating sets of inserted shaping rods one step in the direction opposite to the direction in which the cloth is moving. Moreover, the apparatus of the invention comprises suitably heated plates (thermoknives), which cut and simultaneously burn the cloth lengthwise and transversally.

The advantages of the apparatus of the invention are that it avoids the necessity of inefficient manual labor, the use of reusable expensive rods and of technologically undesirable transversally woven cloth. Furthermore, there is avoided the additional production step of servering by melting, which is now combined with other steps. A possibility is also now provided for simultaneous treatment (shaping) of several pieces of cloth by disposing them one over the other.

For a better understanding of the invention reference should be made to the accompanying drawings in which there is illustrated a preferred embodiment of the invention. In the drawings:

FIGS. 8a, 8b and 8c are side, top and end views respectively of the apparatus as it begins the first step of making the battery separators;

FIGS. 9a and 9b are side and top views respectively of the apparatus during a subsequent stage of operation in which alternating rods have been inserted into the cloth;

Figure 1:
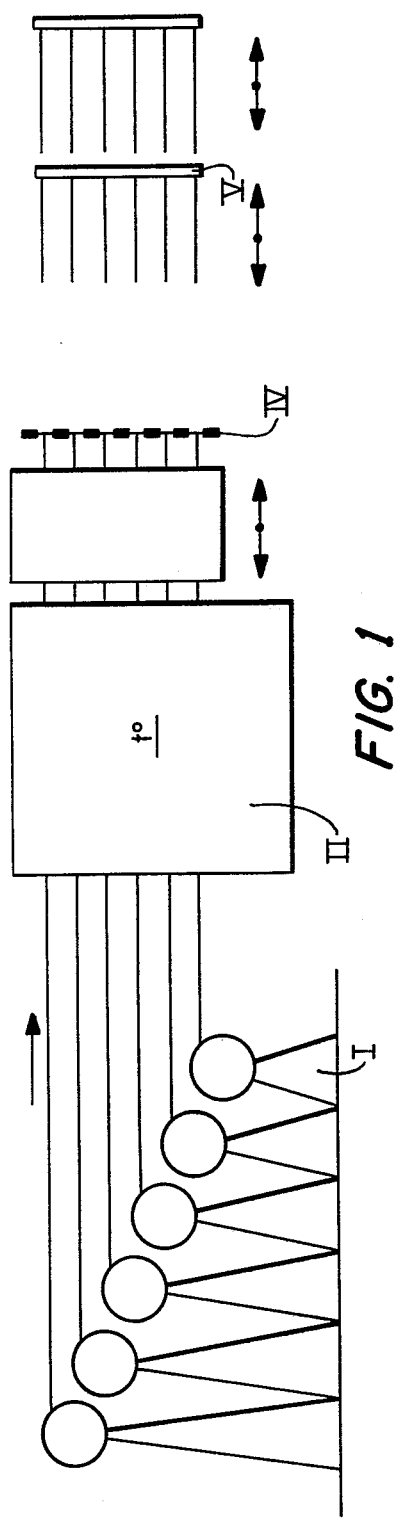
FIG. 1 is a block diagram of the entire apparatus—a side view.
Figure 2:
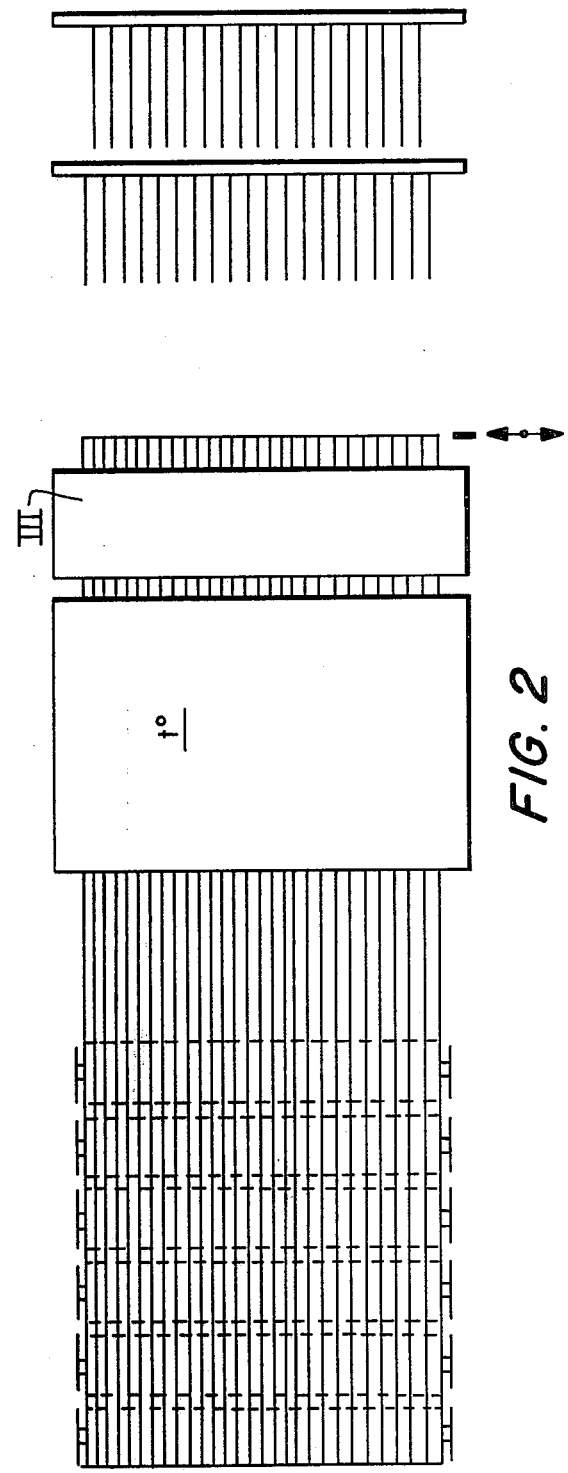
FIG. 2 is a block diagram of the entire apparatus—a top view.

Shown in the block diagram is a preferred embodiment with six simultaneously treated cloths, where the apparatus consists of a supply unit I, a heat treatment furnace II (designated $t°$ in FIGS. 1 and 2), a driving unit III, a cutting and burning unit IV, and pushing combs V.

Figure 3:
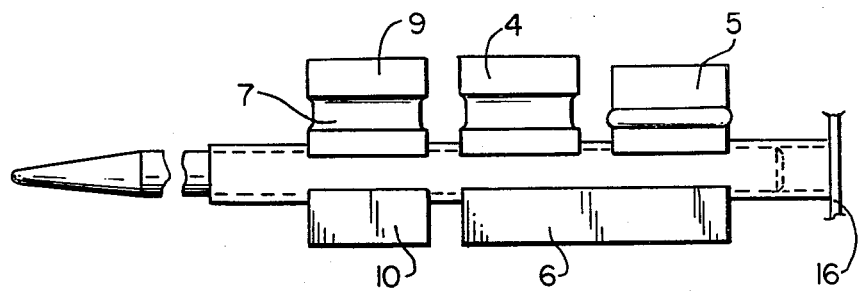
FIG. 3 is a side view of the clamping jaws.
Figure 4:
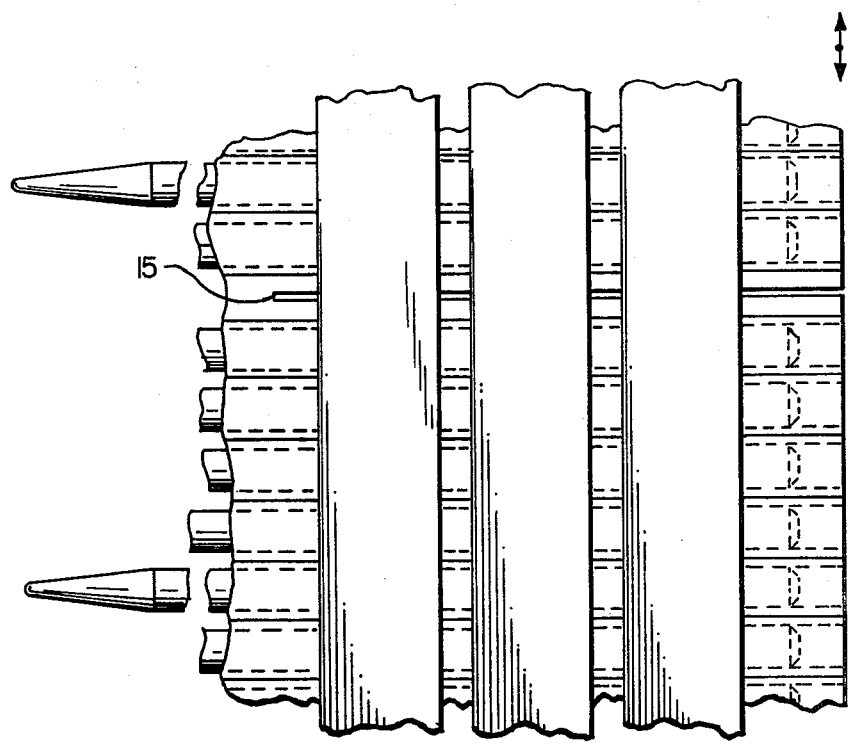
FIG. 4 is a top view of the cloth, the rods and the jaws.
Figure 7:
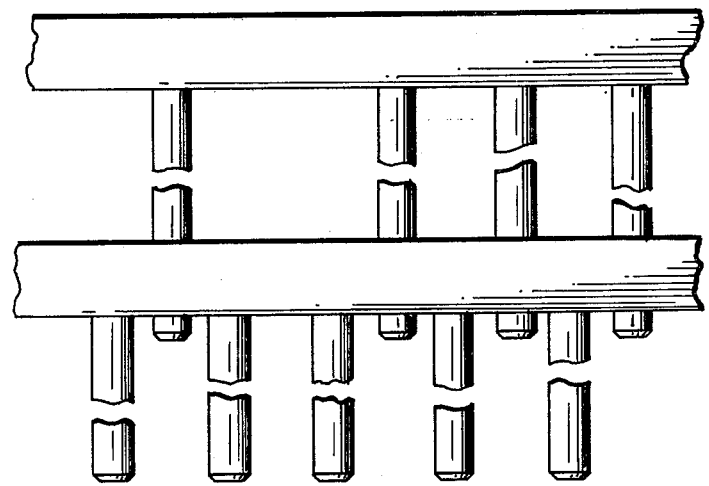
FIG. 7 is a top view of the combs.
Figure 5:
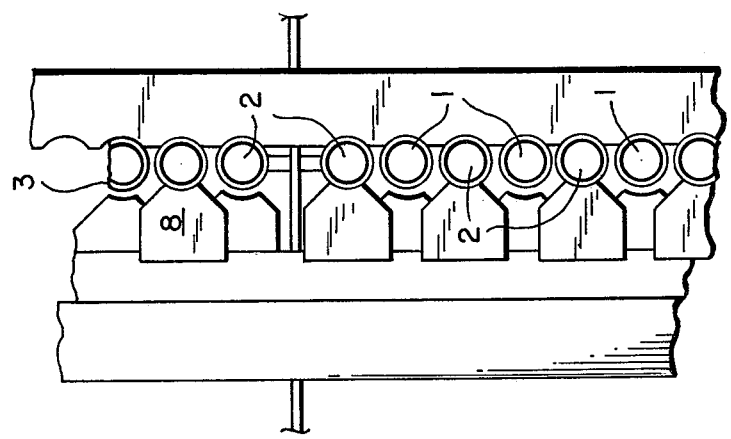
FIG. 5 is a front view of the movable jaws.

Directing attention, first of all, to the driving unit, cutting and burning unit and pushing combs as particularly illustrated in FIGS. 3, 4, 5, 8a, b and c 9a and b and 10a and b two alternating sets of shaping rods 1 and 2 are shown in FIGS. 5, 8a, b and c 9a and b and 10a and b disposed within the corrugations of the lengthwise woven fabric 3, the number of rods being equal to the number of corrugations in the cloth while the length of the rods is greater than the length of the heat treating furnace into which the fabric and rods are to be projected. FIG. 3 shows a side view of one of the shaping rods projecting through the corrugated fabric with the clamping jaws shown disposed on either side of the fabric and rod. Two jaws 4 and 5 are movable in both the horizontal and vertical directions with respect to the fabric and shaping rods shown and engage the stationary lower jaw 6. Compressible elements are shown at 7 which connect each of the jaw members with respective concave members having concave faces which are shown at 8 and whose concave faces engage the rods. Each of the concave members fastened to the jaw 4 is aligned with one of the alternating sets of rods 1 and their respective planes of symmetry are perpendicular to the plane in which these rods lie, while the concave members fastened to the other jaw 5 shown in FIG. 3 are aligned with the other set of alternating rods 2 and pass through the center line of the other set of alternating rods 2 as shown in FIG. 5. Jaws 9 and 10 which are shown in FIG. 3 are movable only in the vertical direction and are horizontally stationary. This pair of jaws is fastened by means of the elastic element 7 to the concave members 8 and the planes of symmetry of these pieces pass through the center line of all of the rods comprising the two alternating sets 1 and 2 as shown in FIG. 5 and are perpendicular to the plane in which these rods lie.

Figure 6:
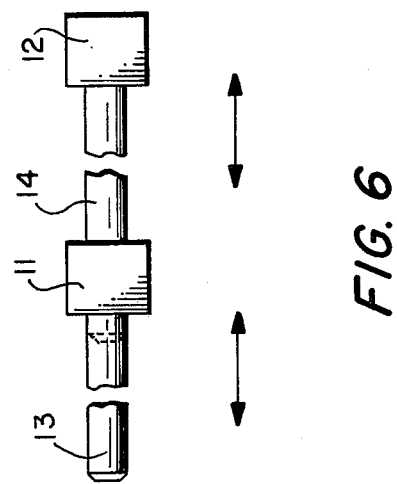
FIG. 6 is a side view of the combs.

Directing attention to FIG. 6 two combs 11 and 12 are shown along with pushing rods 13 and 14. These combs and the associated rods provide the pushing force to the alternating shaping rods to project the shaping rods into the corrugations in the fabric. The cross-section of the pushing rods attached to the combs is either smaller than or equal to the cross-section of the shaping rods which are projected into the corrugations of the fabric and have a length greater than the length of the separator which is being fabricated. The center lines of the pushing rods of the comb 11 coincide with the prolongation of the center lines of the one of the sets of shaping rods 2 while the rods attached to the comb 12 have a center lines coincident with the other set of shaping rods 1. In FIG. 4 stationary cutting and "burning" knives are shown at 15 for cutting and "burning" the cloth 3 in a lengthwise direction. These knives 15 are disposed ahead of the horizontally immovable jaws 9 and 10 while additional movable cutting and "burning" knives 16 are shown for transverse cutting and "burning" disposed after the pair of movable jaws 4, 5 and 6. The shaping rods used for insertion into the corrugations of the fabric are made of polished chrome steel.

Figure 10A:
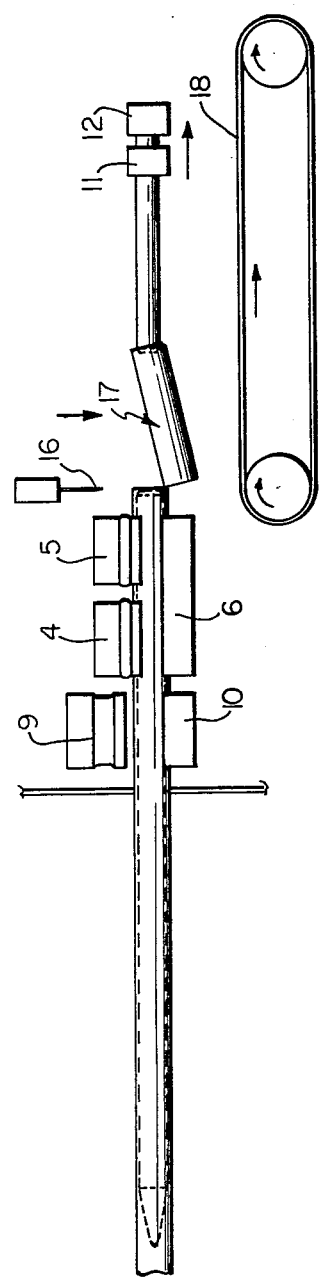
FIGS. 10a and 10b are side and top views respectively of the apparatus following insertion of both sets of rods and the cutting of the formed battery separator.
Figure 10B:
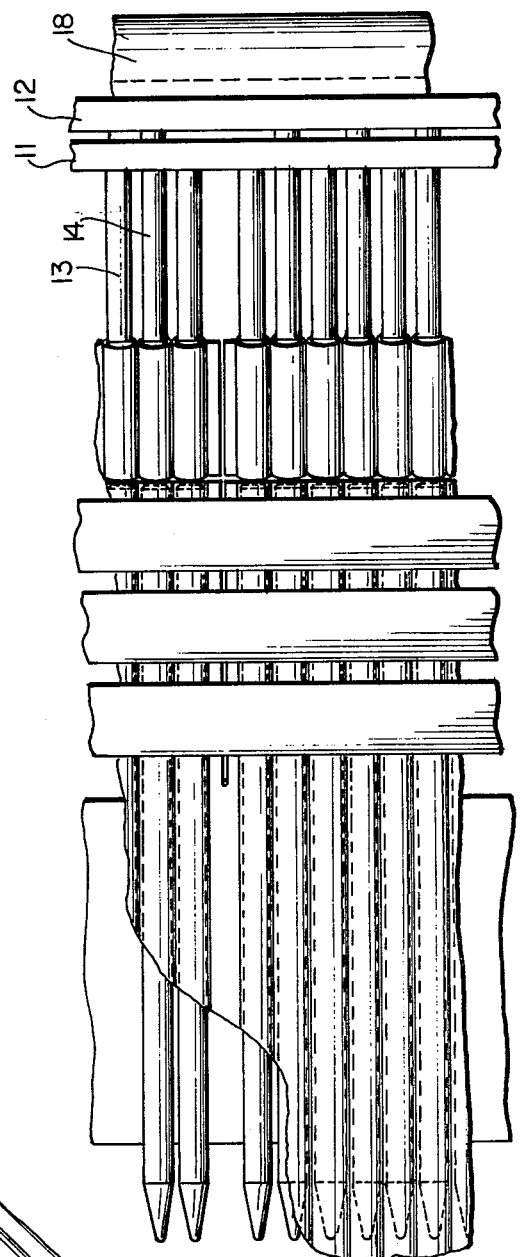
Figure 11:
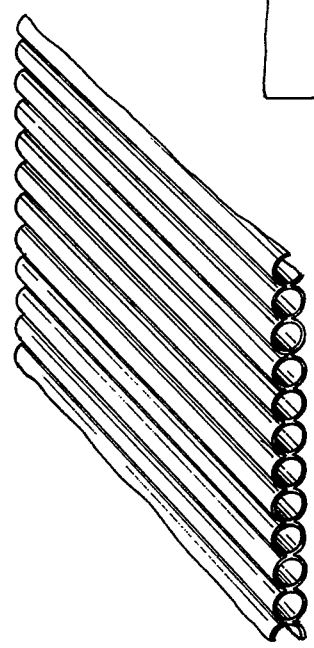
FIG. 11 shows the final "pipe-type" or corrugated battery separator product produced by the invention.

Turning now to the operation of the apparatus of the present invention, subsequent to cutting and removing of a completed batch of separators by means of the cutting and burning knives 16, the two alternating sets of shaping rods 1 and 2 are inserted initially by hand into the corrugations of the cloth 3 and the cloth containing the inserted shaping rods is then grasped by the movable jaw members 4 and 5, and stationary member 6 as shown in FIGS. 8a, 8b and 8c. The jaws 5 and 6 are first actuated so that they rest upon the cloth in the position at which one set of shaping rods are inserted. Then the comb 13 and 11 begins to move in a lateral direction toward the jaws and pushes the alternate set of shaping rods through the corrugations of the cloth into which they are inserted a predetermined distance, while the cloth itself is held stationary by means of the jaws 5 and 6 which restrain the cloth by holding it at the other set of corrugations. Next, as shown in FIGS. 9a and 9b the second set of jaws 4 and 6 are activated and press upon the corrugations into which the shaping rods were just moved a predetermined distance and which will be referred to as the second set of alternating corrugations and shaping rods. The jaws 5 and 6 which held the cloth at the first set of corrugations and shaping rods is then released and the comb 14,12 begins to move in a lateral direction toward the jaws and presses the now released shaping rods further into the first set of corrugations in the same manner in which the second set of shaping rods was previously pressed further into the first set of alternate corrugations. Then the set of jaws 5,6 which was in the release position is again activated to press the first set of alternating rods so that both alternating sets of corrugations and inserted shaping rods are now pressed by the respective sets of jaws. Both combs 13,11 and 14,12 are then pulled a small distance back from the jaws and cloth to provide a passage for the transverse cutting knife. Once the heated knife 16 has performed its cutting operation it is returned to its initial position and the combs are moved further backward away from the cloth and shaping rods. This permits the severed, formed sections of separator 17 to fall away between the withdrawn pushing rods of the comb and inserted rods in the remaining corrugated cloth as shown in FIGS. 10a and 10b. A conveyor belt 18 then conveniently removes the formed separator. The jaws 4, 5 and 6 remain clamped about the cloth and begin a lateral motion toward the combs and away from the released set of jaws 9,10 which do not move in the lateral direction. In this manner the corrugated material is moved into place for the beginning of the next operation. It is at this stage that the material is cut in a lengthwise direction by the longitudinal heated knives 15 and simultaneously passed through the heating furnace where it is heat treated. The jaws 9 and 10 are then activated in a vertical direction so that they grasp the cloth at both of the alternating sets of corrugations and inserted rods, thereby preventing the cloth from moving backward when the other jaws 4, 5 and 6 are returned to their original position adjacent jaws 9 and 10. Both sets of jaws 4, 5 and 6 are then opened and returned to their initial position. The jaws 5 and 6 are then activated to press upon the first set of corrugations and inserted shaping rods and the jaws 9 and 10 is opened releasing its grip on the entire piece of corrugated cloth and inserted shaping rods thereby terminating one cycle of the operation and beginning the initial steps of the next identical cycle.

We claim:

1. An apparatus for the production of corrugated pipe-type armoured separators comprising alternating first and second sets of shaping rods and driving rods, wherein the shaping rods are adapted to be positioned in respective first and second sets of parallel channels in a lengthwise woven cloth, while the length of said shaping rods is greater than the length of a curing furnace means disposed to receive said cloth and shaping rods, and first and second sets of jaws having both lateral and vertical movement, onto which, by means of elastic elements there are fastened shaped means for engaging said shaping rods and cloth channels, the planes of symmetry of said shaped means fastened to one of the sets of jaws passing through the center lines of the first set of shaping rods and being perpendicular to the plane in which these rods lie, while the planes of symmetry of said shaped means of the other set of jaws passes through the center lines of the second set of shaping rods, a third, laterally stationary set of jaws having fastened thereto by means of a further elastic element shaped means for engaging said shaping rods and cloth channels, and the planes of symmetry of these shaped means pass through the center lines of both sets of shaping rods and are perpendicular to the plane in which these rods lie; a pair of driving combs, for moving said driving rods in a lateral direction having movement in the lateral direction, each of said driving combs being attached to one of said sets of driving rods which has a cross-section smaller than the cross-section of said shaping rods, the center lines of the driving rods of one of the driving combs coincide with the prolongations of the center lines of one of said sets of shaping rods, while those of the other driving comb have center lines coincident with said other set of shaping rods.

2. Apparatus for the production of pipe-type armoured separators according to claim 1, which includes cutting and burning knives for lengthwise cutting and burning of the cloth, disposed ahead of said laterally stationary set of jaws over a determined number of channels and a movable cutting and burning knife for transversal cutting and burning, disposed after said first and second sets of jaws having lateral and vertical movement.

3. An apparatus for the production of corrugated pipe-type armoured separators according to claim 1, wherein the shaping rods are of steel, polished and hard chromed.

* * * * *